United States Patent

[11] 3,614,641

[72] Inventors Francis T. Thompson
Murrysville;
Leonard C. Vercellotti, Verona, both of Pa.

[21] Appl. No. 863,829
[22] Filed Oct. 6, 1969
[45] Patented Oct. 19, 1971

[73] Assignee Westinghouse Electric Corporation
Pittsburgh, Pa.

[54] FREQUENCY DEMODULATOR
13 Claims, 6 Drawing Figs.

[52] U.S. Cl. 329/110, 307/233, 307/246, 328/151, 329/126
[51] Int. Cl. H03d 3/04
[50] Field of Search 329/110, 107, 126, 104; 328/119, 118, 151, 153, 146, 147; 307/233, 232, 246; 325/320, 326; 178/6.6 A, 66, 88

[56] References Cited

UNITED STATES PATENTS

| | | | |
|---|---|---|---|
| 3,025,414 | 3/1962 | McVey | 328/147 X |
| 3,217,183 | 11/1965 | Thompson et al. | 307/232 |
| 3,223,929 | 12/1965 | Hofstad et al. | 325/320 UX |
| 3,372,234 | 3/1968 | Bowsher et al. | 325/326 X |
| 3,479,598 | 11/1969 | Weller | 329/104 X |
| 3,504,289 | 3/1970 | Pfeiffer et al. | 328/147 |
| 3,508,158 | 4/1970 | Marchese | 329/107 X |

OTHER REFERENCES

Chittenden et al., " Sampling Control for Analog Waveform Analyzer" Vol. 9, No. 6, Nov. 1966, IBM Technical Disclosure Bulletin pp. 602, 603 328–151.

*Primary Examiner*—Alfred L. Brody
*Attorneys*—F. H. Henson, C. F. Renz and A. S. Oddi

ABSTRACT: A frequency demodulator and method for demodulating frequency modulated (FM) signals, which may have been previously recorded on a recording medium, modulated in accordance with a video waveform, for example, wherein potentials are stored, for example, by capacitors, in response to selected half-periods of the recorded FM signals, and selecting, by auctioneering for example, one of the stored potentials which is indicative of the intelligence in the FM signals under consideration.

WITNESSES:
Alfred G. Colaizzi
James F. Young

INVENTORS
Francis T. Thompson &
Leonard C. Vercellotti
F. Samuel Cotti
ATTORNEY

FREQUENCY DEMODULATOR

BACKGROUND OF THE INVENTION

1. Field of the Invention

The present invention relates to frequency demodulation methods and apparatus and, more particularly, to the demodulation of frequency modulated (FM) signals which have been recorded in video recording systems.

2. Discussion of the Prior Art

The recording of video information on magnetic recording media, such as tapes, disc or drums, has become increasingly important for the storage and instant replay of televised programs material, the storage and retrieval of documents and the recording of fluoroscopic X-ray images, as well as many other uses. Because of the wide bandwidth requirement of video signals, for example 4 megahertz for monochrome television signals, it is necessary that special techniques be employed for recording the wide band video signals to provide high quality reproduction thereof. A technique commonly used for recording video signals is to frequency modulate a carrier frequency with the video signals and then to record the FM signals. A recording system utilizing a magnetic recording disc may have a typical frequency response extending from approximately 100 Hz. to 5.5 MHz. If a frequency modulation recording technique were used, a carrier frequency would be selected somewhere within the frequency response of the recording disc and this carrier modulated according to the video information in a video waveform to be recorded, so that, for example, the black level of a scene would be represented by a frequency of 5.5 megahertz while a frequency of 4 megahertz would be used to represent the white level of a scene. In a typical playback system for such frequency modulated recorded video information, the frequency modulated signals are amplified and then limited and applied to a frequency demodulator which is responsive to the zero crossings of the limited output so as to provide a constant pulse width each time the zero axis is crossed. Thus a pulse train of constant pulse width pulses is provided whose pulse repetition rate varies according to the frequency of the FM signals. Accordingly, higher frequencies will provide more closely spaced pulses while lower frequencies will provide more widely spaced pulses. The pulse train is applied to a phase-corrected, low-pass video filter which provides as its output a voltage proportional to the average value of the pulse train input waveform thereto. For recorded waveforms of high frequency, since the pulses are closely spaced, a high value average output is provided, while for lower frequencies, since the pulses are more widely spaced, a lower average value output is provided. The average values so provided are indicative of the original video information that had been recorded, with white being indicated by a low average value, black by a high average value and the various shades of gray having intermediate average values. It is necessary to utilize a phase-corrected, low-pass filter whose components are carefully selected and matched in order to obtain high quality video reproduction which is free from transient ringing. Such phase-corrected filters are expensive, and it would be highly desirable if such a filter could be eliminated from the playback system.

SUMMARY OF THE INVENTION

Broadly the present invention provides a frequency demodulation method and apparatus wherein a phase-corrected filter is not required and wherein the demodulation of FM signals is accomplished by storing potentials in response to selected half-periods of the FM signals and selecting one of the potentials which is indicative of the intelligence within the FM signals under consideration.

DESCRIPTION OF THE PREFERRED EMBODIMENTS

A. Two Capacitor Demodulator system—FIGS. 1 and 2

Figure 1:
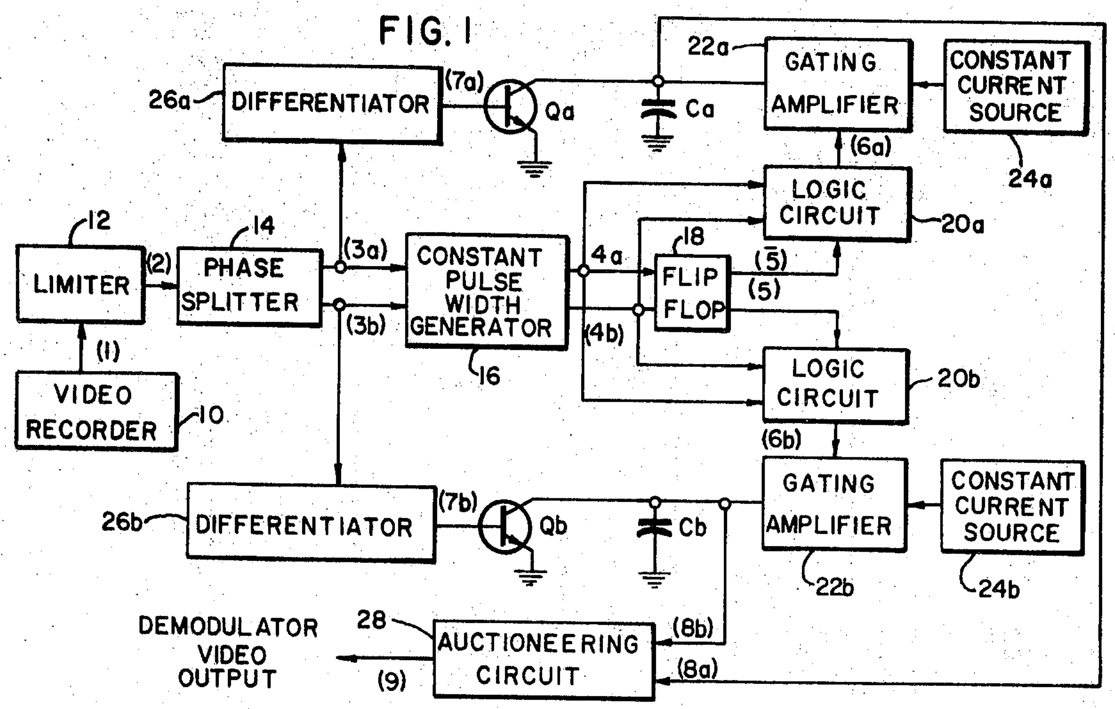
FIG. 1 is a schematic block diagram of one embodiment of the present invention.
Figure 2:
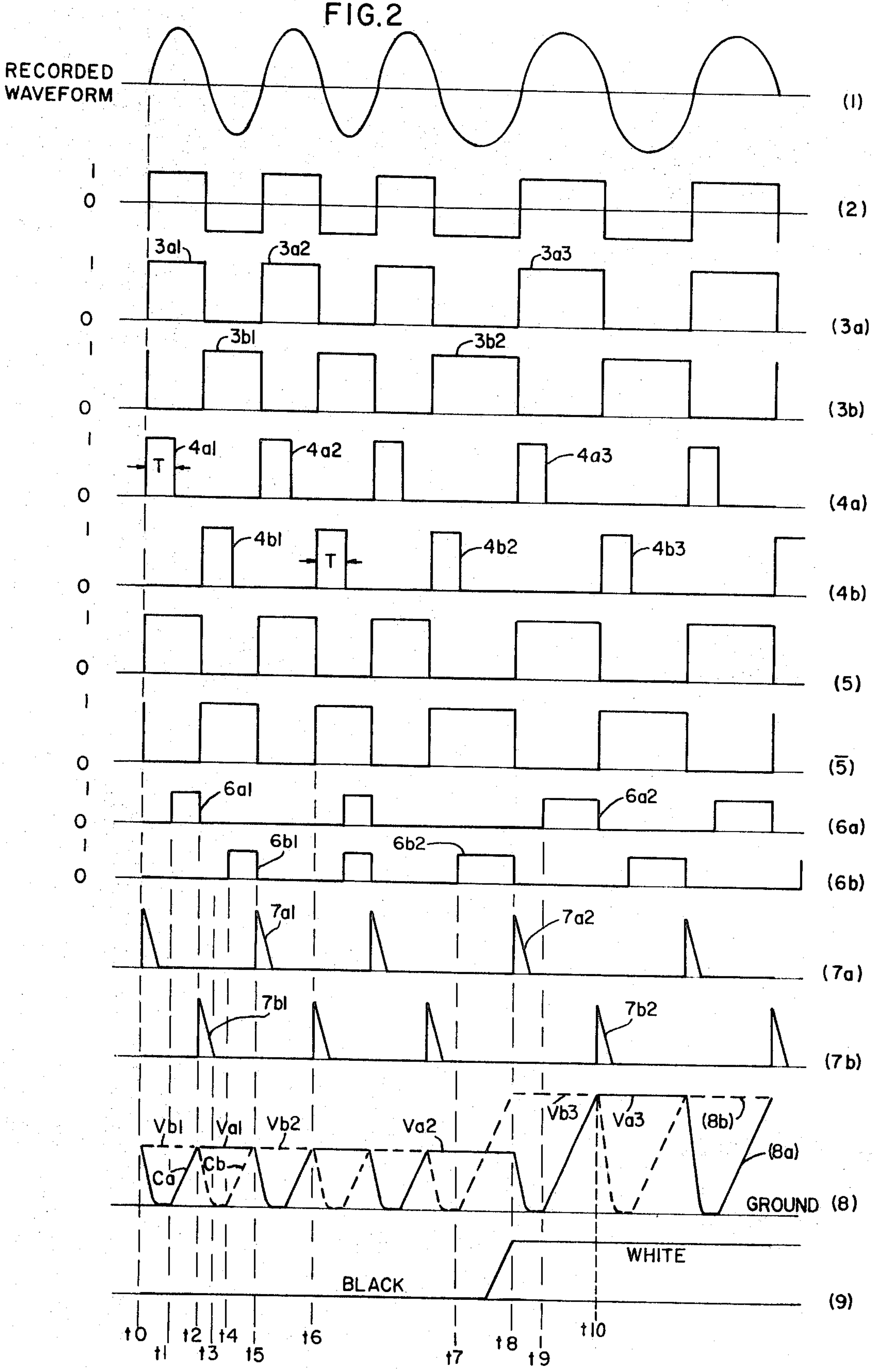
FIG. 2 is a waveform diagram including a series of curves utilized in explaining the operation of FIG. 1.

Referring to FIGS. 1 and FIG. 2, the system of FIG. 1 and the method of operation thereof will be considered with reference to the curve of FIG. 2 wherein the number and letter references within the parenthesis indicate wherein FIG. 1 the waveforms of the respective curves of FIG. 2 appear. In FIG. 1 a video recorder 10 is provided which includes a magnetic recording medium such as tape, disc or drum apparatus. Recorded within the video recorder 10 are frequency modulated signals wherein a carrier frequency is deviated in response to the amplitude of a video waveform. For example, deviations of the carrier frequency to higher frequencies may be considered to be in the black direction with the highest frequency deviation occuring at the maximum black level while frequency deviations of the carrier frequencies to lower frequencies may be considered to be toward the white direction with the lowest frequency deviation being at the maximum white level.

Curve 1 of FIG. 2 shows a waveform representation of the frequency modulated signal recorded in the video recorder 10, with the waveform being substantially sinusoidal. In curve 1 it can be seen that the signal on the left-half of the waveform is at a higher frequency than that of the right-half. For the purposes of example, assume that the left-half of the waveform is indicative of black while the right-half of the direction is indicative of white video information.

The output of the video recorder 10 is an electrical signal varying as shown in curve 1 in frequency and is applied to a limiter 12. The function of the limiter 12 is to limit the waveform or curve 1 to a constant amplitude in both positive and negative directions and also to provide rectangular pulse outputs having equal half-period times as compared to the half cycles of the sinusoidal waveform of curve 1. Note that the frequency of the signals represented in curves 1 and 2 is the same and the curves cross the zero axis at the same time.

The output of limiter 12 is shown in curve 2 is applied to a phase splitter 14 wherein the phase thereof is split to provide the opposite phase waveforms as shown in curves *32* and 3*b* of FIG. 2. In other words, when the curve *32* is at a ONE output level the curve 3*b* is at a ZERO output level and vice versa. It should however be noted that the curves 3*a* and 3*b* have the same frequency as curves 1 and 2 and the same zero crossing times.

The outputs of the phase splitter 14 as shown in curves *32* and 3*b* are applied to a constant pulse width generator 16. The function of the constant pulse width generator is to sense when the waveforms of curves *32* and 3*b* change from a ZERO level to a ONE level and to provide a constant width pulse on response thereto respectively. These constant width pulses are shown in curves *42* and 4*b*, respectively, and are indicated to have a constant pulse width T. As an example of this a ONE level pulse *421* of curve 4*a* is initiated at a time $t_o$ by the constant pulse width generator 16 in response to a pulse 3*a*1 of curve (3*a*) changing from a ZERO to a ONE level with the pulse 4*a*1 terminating at a time $t_o$ when it reaches a pulse width T. The pulse 4*a*1 will have the constant pulse width T regardless of how long the pulse 3*a*1 remains at the ONE level. Similarly when a pulse 3*b*1 in curve 3*b* goes from a ZERO to a ONE level, a pulse 4*b*1 in curve 4*b* is initiated by the constant pulse width generator 16 and continues for a constant pulse width T before being terminated.

The two outputs shown in curves 4*a* and 4*b* of the constant pulse width generator 16 are applied to a flip-flop 18 which changes output states in response to the constant pulse width pulses applied respectively to the two inputs thereof. For example, the pulse 4*a*1 causes the flip-flop 18 to provide a ONE output at its 5 output and a complementary ZERO output at its $\overline{5}$ output. The outputs of the flip-flop 18 are shown in curves 5 and $\overline{5}$ of FIG. 2. The pulse 4*b*1 causes the flip-flop 18 to change its output state so that a ZERO is provided at the 5 output and a ONE at the complementary $\overline{5}$ output.

The $\overline{5}$ output of flip-flop 18 is applied to a logic circuit 20*a*and the 5 output of the flip-flop 18 is applied to a logic circuit 20*b*. The logic circuits 20*a* and 20*b* also receive the outputs 4*a* and 4*b* of the constant pulse width generator 16. The logic circuits 20*a* and 20*b* in the present example perform the NOR logic function, that is, when all three of the inputs thereto are at ZERO levels, a ONE output will be provided from the outputs 6*a* and 6*b*, respectively thereof. The outputs of the logic circuits 20*a* and 20*b* are utilized to control gaining amplifiers 22*a*and 22*b* respectively. When the logic circuit 20*a* provides a ONE output at its output 6*a*, the gating amplifier 22*a* is turned on to provide a conductive path therethrough so that a constant current source 24*a* is connected to an integrating capacitor C*a* which is connected across the output of the gating amplifier 22*a*. As long as the gating amplifier 22*a* is turned on, the capacitor C*a* will charge linearly from the constant current source 24*a*. When the output of the logic current 20*a* goes to ZERO, the gating amplifier 22*a* is turned off blocking the constant current source 242 from charging the capacitor C2. Similarly to this, a ONE output from the logic circuit 20*b* turns on a gating amplifier 22*b* so that an integrating capacitor C*b* is charged from a constant current source 24*b*. When the output 6*b* of the logic circuit 20*b* is a ZERO, the gating aMplifier 22*b* is turned off to block the constant current source 24*b* from charging the capacitor C*b*.

The discharge of the capacitor C*a* and the capacitor C*b* is accomplished by discharge circuits which include the transistor Q*a* and differentiator 26*a* for the capacitor C*a* and the transistor Q*b* and the differentiator 26*b* for the capacitor C*b*. The differentiator 26*a* receives the output 32 of the phase splitter 14 and differentiates it to provide a spike output such as shown in curve 7*a* when the 3*a* input thereto changes from a ZERO to a ONE level. The spike output of the differentiator 26*a*is applied to the base electrode of the transistor Q*a* thereby turning on this transistor to discharge the capacitor C*a* through the collector-emitter circuit thereof to ground. Similarly, the differentiator 26*b* differentiates the output 3*b* of the phase splitter 14 to provide a spike output as shown in curve 7*b* in reSponse to the output 3*b* going from a ZERO to a ONE level. The spike output of the differentiator 26*b* is applied to the base of transistor Q*b* to turn on this transistor and provide a discharge path through the collector-emitter circuit thereof to discharge the capacitor C*b*.

Referring to curve 8 of the FIG. 2, which is a composite waveform diagram of the voltages developed across the capacitors *ca* and C*b*, respectively, the voltage across the capacitor C*a* is shown as a solid line and is designated 8*a*, and the voltage across the C*b* is shown by a dashed line and indicated as 8*b*. At the time *t*1, in the example as shown in curve 8, the capacitor C*a* is in a discharged state, at ground level, and the capacitor C*b* is charged to a voltage V*b*1. The charg-iNG cycle for the capacitor C*a* is commenced at the time tl with a pulse 6*a*1 being supplied to the gating amplifier 22*a* from the logic circuit 20. The pulse 6*a*1 is provided since at this time as can be seen by curves 4*a*, 4*b* and $\overline{5}$ of FIG. 2, the logic circuit 20*a* receives ZERO inputs from outputs 4*a* and 4*b* of the constant pulse width generator 16 and the $\overline{5}$ output of the flip-flop 18. At the time tl constant constant pulse width pulse 4*a*1 is terminating while the constant pulse width pulse 4*b*1 does not commence until a later time t2. Thus, with the flip-flop 18 providing a ZERO output from the $\overline{5}$ output thereof, the logic circuit 20*a* provides a ONE output pulse 6*a*1 as shown in curve 6*a* to the gating amplifier 22*a* which cause the capacitor C*a* to be charged linearly from the constant current source 24*a* as shown by the solid curve in curve 8*a* between the times t1 and t2.

The charging of the capacitor C*a* is terminated at the time t2 in that the pulse 4*b*1 occurs at the time t2 causing the logic circuit 20*l* to revert to a ZERO output state at the output 6*a*, which turns off the gating amplifier 22*a*. The voltage across the capacitor C*a* remains at the level V*a*1 as shown in curve 8*a*.

At the time t2, when the pulse 3*b*1 instigates the generation of the constant width pulse 4*b*1 the pulse 3*b*1 is differentiated by the differentiator 26*b* to provide the spike pulse 7*b*1 as shown in curve 7*b*. The pulse 7*b*1 turns on the transistor Q6 thereby discharging the capacitor C*b* from its previously charged voltage of V*b*1 to a ground potential at a time t3. Thus at the time t3 the capacitor C*a* is charged to a voltage V*a*1 and the capacitor C*b* is discharged to ground potential.

The voltage outputs from the capacitors C*a* and C*b* are applied to an auctioneering circuit 28 which selects the higher voltage of the two. Hence, during the times t0 to t2 the auctioneering circuit 28 would select the voltage V*b*1 as shown in curve 8*b* and between the time t2 until the capacitor C*a* is discharged the auctioneering circuit 28 will select the voltage *va*1 from the capacitor C*a*. The output of the auctioneering circuit 28 is shown in curve 9 of FIG. 2. The output of 9 of the auctioneering circuit 28 is the demodulated video output and is indicative of the intelligence as originally modulated and recorded in the frequency modulated signal such as shown in curve 1. As indicated on curve 9, for the time under consideration, for the voltage levels V*a*1 and V*b*2, a black output is provided by the curve 9 corresponding to the relatively high frequency of the FM signal of curve 1 during this time.

The charging of the capacitor C*b* begins at a time t4 when the constant pulse width pulse 4*b*, terminates after a constant pulse width T. At the time t4 ZERO inputs are provided to the logic circuit 20*b* from the constant pulse generator 16 at outputs 4*a* and 4*b* and also from the flip-flop 18 output 5. The logic circuit 20*b* thus supplies a ONE output 6*b*1 as shown in curve 6*b* to turn on the gating amplifier 22*b*. The gating on of the gating amplifier 22*b* connectS the constant current source 24*b* to the capacitor C*b*thereby causing the capacitor C*b* to be charged linearly as shown in curve 8*b* between the times t4 and t5. At the time t5 the charging of the capacitor C*b* is terminated since the constant pulse width pulse 4*a*2 appears at this time being instigated in response to the pulse 3*a*2 being applied to the input of the constant pulse width generator 16. At the time *t*5 the logic circuit 20*b* thus outputs a ZERO to the gating amplifier 22*b* turning it off and disconnecting the constant current source 24*b* from the capacitor C*b*. The capacitor at the time t5 is charged to a voltage V*b*2 which is indicated in curve 8*b* and is substantially equal to the voltage V*b*1.

At the present time t5 the discharge of the capacitor C*a* is also instigated in that the pulse 3*a*2 is also supplied to a differentiator 26*a* which supplies a spike output pulse 7*a* 1 that is applied to the transistor Q*a* turning on this transistor and discharging the capacitor C*a* therethrough from the voltage level V*a*1 to a ground potential. During the time interval t5 to t6 the auctioneering circuit 28 will output the voltage V*b*2 being the higher of the two voltages applied thereto during this tine period. In curve 9 the output of the auctioneering circuit 28 still remain at the black level since the curve 1 is still at the same high frequency level.

It should be noted that the magnitude of the voltages curves 8*a* and 8*b* to which the capacitor C*a and* C*b* charge are directly proportional to each half period of the frequency modulated waveform of curve *a* and the waveform of curve *b*. This may be seen in that the capacitors C*a* and C*b* are only permitted to charge for the time period between constant pulse width pulses as shown in curves 4*a* and 4*b*. Accordingly, the capacitor C*a*is charged between the times t1 and t2 with the pulse 4*a*1 terminating the time t1 and the pulse 4*b*1 beginning at the time t2. Since the pulse 4*a*1 has a constant pulse width T, the magnitude of voltage *va*1 to which the capacitor C*a* charges is directly related to the half-period time t0 to t2 for the waveforms of curves 1, 2 and 3*a*. Similarly the capacitor C*b* is permitted to charge between the times t2 and 64 with the constant pulse 4*b*1 terminating at the time t2 and the constant pulse width pulse 4*a*2 beginning at the time t4. Hence the magnitude of voltage V*b*2 to which the capacitor C2 is permitted to charge is directly related to the half-period time t2 to t5 for the curves 1, 2 and 3*b*. In other words, the present demodulation system and method converts the time length of each half period of the FM signals into corresponding voltage levels.

The demodulated video output as shown in curve 9 will remain at the black level as indicated until the frequency of the recorded frequency modulated signal as shown in curve 1 changes. Until this change occurs the demodulation operation will continue as described with the magnitude to Which the capacitors C*a* and C*b* charge being determined by the time period between the respective generation of the constant pulse width pulses of the curves 4*a* and 4*b*.

Considering now a later time t7 when the frequency of the FM signal of curve 1 decreases being indicative that white information is included in the FM waveform. At the time t7 a constant pulse width pulse 4*b*2 terminates after having been initiated a time period T previously in response to a pulse 3*b*2 as shown in curve 3*b*. With the termination of the pulse 4*b*2, ZERO input signals are provided to the logic circuit 20*b* from the inputs (4*a*, 4*b* and 5 causing the logic circuit 20*b* to output a pulse 6*b*2 to the gating amplifier 22*b* which instigates the charging cycle or the capacitor C*b* from the constant current source 24*b*. The capacitor C*b* charges linearly as shown in curve 8*b* from the time t7 to a time t8. The linear charging of the capacitor C*b* continues until the time t8 to a voltage level V*b*3 which is higher than the previous voltage level V*b*1 and V*b*2. This is due to the fact that the charging of the capacitor C*b* continues until the tine t8 until a constant pulse width pulse 4*b*3 is generated in response to the appearance of a pulse 3*a*3 from the phase splitter 14 indicating the beginning of a new half-period of the recorded waveform of curve 1. The generation of the pulse 4*a*3 causes the logic circuit 20*b* to output a ZERO thereby turning off the gating amplifier 22*b*and terminating the charging cycle of the capacitor C*b*.

It should be noted that the charging cycle for the capacitor C*b* from t7 to t8 in the present example is shown to be twice as long as the previous charging cycles for the capacitor C*b* from T4 to T5. Thus the capacitor C*b* is charged to a voltage V*b*3 which is twice the value of the voltages V*b*1 and V*b*2. The magnitude of the voltage to which the capacitor C*b* charges is directly dependent upon when the next half-period of the waveforms 1 and 2 appear to terminate the charging cycle. The lower the frequency of the waveforms 1 and 2 the higher the value of the charging voltage on the capacitor C*b*.

At the time t8 the capacitor C*a* having been previously charged to a voltage level V*a*2 equal to the voltage level V*a*1, V*b*1, V*b*2, is discharged in response to a spike pulse 7*a*2 being applied to the transistor Qa with the capacitor C*a* discharging to a ground potential. The auctioneering circuit 20*a* is responsive to the output the larger of the two input voltages 8*a* and 8*b* thereto and therefore when the voltage of curve 8*b* exceeds the voltage of the curve 8*a* somewhere between the time t7 and t8 the output of the auctioneering circuit 20*a* will increase as shown in curve 9 to correspond to the voltage level V*b*3 as stored in the capacitor C*b*. As indicated on curve (9) the voltage corresponding to the voltage V*b*3 is indicative of a white level of video intelligence.

At a time t9 when the constant pulse width pulse 4*a*3 terminates, the logic of the circuit 20A supplies a ONE output pulse 6*a*2 to the gating amplifier 22*a* which instigates the charging cycle for the capacitor C*a* to be charged linearly from the constant course 24*a* as shown in curve (8*a* between the times t9 and t10. At the time t10 a constant pulse width pulse 4*b*3 is supplied to the logic circuit 20*a* thereby terminating the pulse 6*a*2 which turns off the gating amplifier 22*a* with the capacitor C*a* storing a voltage V*a*3 which is equal to the voltage V*b*3. At the time t10 a spike voltage pulse 7*b*2 is applied to the transistor Q*b* causing the capacitor C*b* to discharge to ground potential. The auctioneering circuit 28 selects the higher of the two voltages which is the voltage V*a*3 and supplies a demodulated video output as shown in curve 9 at the white level. The operation of the demodulating system hence continues as described at the white level as long as the frequency of the recorded FM signal remains at the low frequency level corresponding to white video intelligence. The described demodulating system of course responds to video information in the gray level between the black and white levels with the charging times for the respective integrating capacitors C*a* and C*b* being determined by the time duration of each half period of the recorded FM signals. The demodulated video output 9 provided is a reconstruction of the original video information that had been utilized to frequency modulate the carrier frequency for recording. This demodulated output 9 is provided without the need of a phase-corrected, low-pass filter as was required in the prior art and thus provides substantial cost advantages over prior art systems.

B. Four Capacitor Demodulating System—FIGS. 3 and 4

Figure 3:
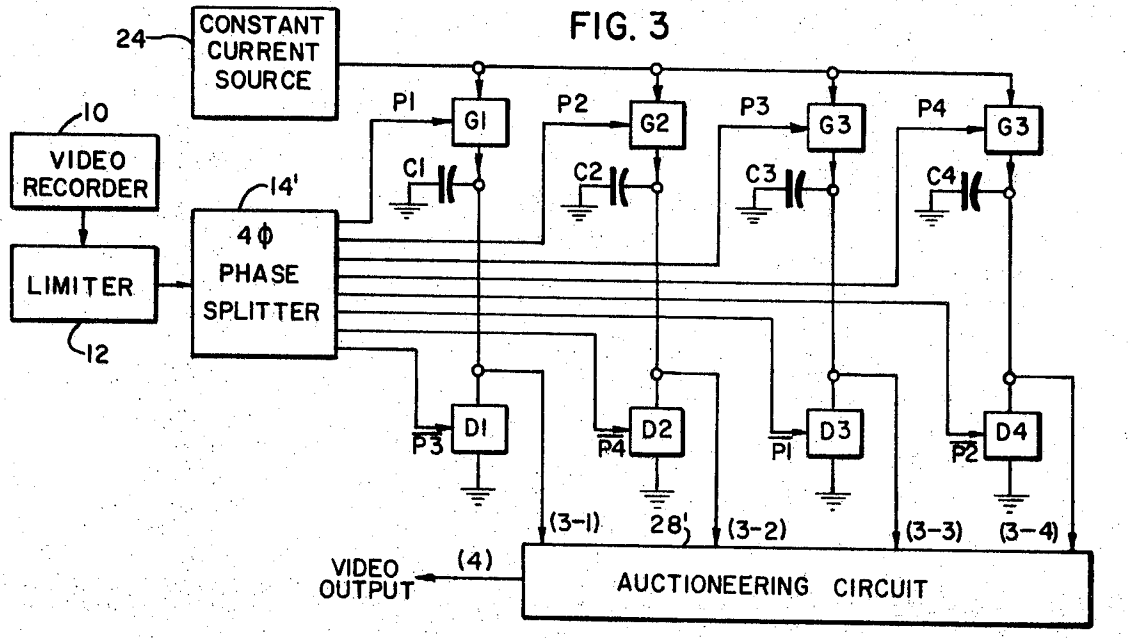
FIG. 3 is a block schematic diagram of another embodiment of the present invention.
Figure 4:
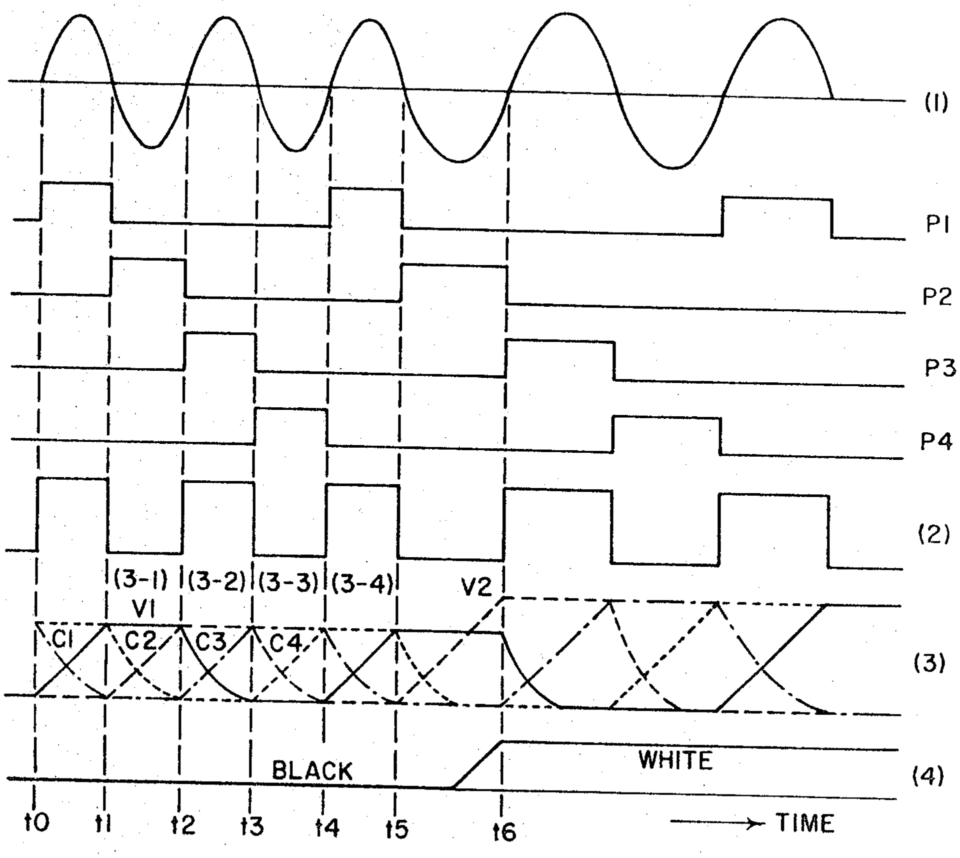
FIG. 4 is a waveform diagram including a series of curves utilized in explaining the operation of the embodiment of FIG. 3.

Another embodiment of the present invention is shown in FIG. 3 and is operative to change the time duration of the half-periods of a frequency modulated waveform into a corresponding voltage level which is indicative of the original video intelligence. Corresponding circuit functions in FIGS. 3 will be designated with the same reference characters as those in FIG. 1. Also curves 1 and 2 of FIG. 4 are substantially identical to curves 1 and 2 of FIG. 2, respectively. 78 81 in 84 1 the video recorder 10 provides the output curve 1 to a limiter 12 which supplies the output waveform of curve 2. The individual half cycles of curve 2 of FIG. 4 are designated P1, P2, P3 and P4 for four successive half-periods thereof. The output 2 of the limiter 12 is applied to a four-phase phase splitter 14'which supplies as outputs thereof pulses p1 P2, P3 and P4 as shown in the curves 2 of FIG. 4 and also the complements of these signals, respectively, $\overline{P1}$, $\overline{P2}$, $\overline{P3}$, $\overline{P4}$. The outputs P1, P2, P3 and P4 of the four-pahse phase splitter 14' are applied to gating amplifiers G1, G2, G3 and G4, respectively. The gating amplifiers G1, G2, G3 aNd G4 correspond to the gating amplifiers 222 and 22*b* of FIG. 1 as to their function. In response to the pulses P1, P2, P3 and P4, respectively, gating amplifiers G1, G2, G3 and G4 are turned on to provide a charging plan therethrough from a constant current source 24 to charge the capacitors C1, C2, C3 and C4, respectively. The charging operation of the respective capacitors C1, C2, C3 aNd C4 is terminated when the pulses P1, P2, P3, P4 reverse phase, respectively.

The compelmentary outputs $\overline{P3}$, $\overline{P4}$, $\overline{P1}$ and $\overline{P2}$ of the four-phase splitter 14' are applied, respectively, to discharge circuits D1, D2, D3 and D4. The discharge circuits D1, D2, D3 and D4 correspond in function to the transistors Q*a* and Q*b* of FIG. 1 but have only been shown schematically in FIG. 3 for the purpose of simplicity and clarity. The capacitor C1 is charged via the gating amplifier G1 from the current source 24 during the time period t0 to t1 when the pulse P1 is at its positive polarity. The capacitor C1 charges to a voltage V1 as shown in the solid curve 3–1 of FIG. 4 and remains there until the time t2 when the complementary output $\overline{P3}$ will be at a negative polarity to cause the discharge circuit D1 to discharge the capacitor C1 therethrough to a ground potential at time t3 as shown in curve 3–1. The capacitor C1 remains discharged through the time t3 to time t4 when its charging cycle is initiated to be charged to the voltage V1 again at the time t5.

The other capacitors C2, C3 and C4 are respectively charged and discharged in a similar fashion to the capacitor C1 during their respective charging and discharging times as better shown in the composite curves of curve 3 wherein the dashed curve 3–2 is indicative of 3 voltage on the capacitor C2, the dash-dot curve 3—3 is indicative of the voltage on the capacitor C3 and the dotted curve 3–4 is indicative of the voltage on the capacitor C4. From curve 3 it can be seen that the capacitor C2 is charged during the time period t1–t2 maintained in its charged state until the time t3 and discharged during the time period t3–t4. The capacitor C3 is discharged during time t0–t1, charged during the time t3–t4, maintained at its charged level during the times t2–t3 and discharged again during the time t4–t5. The capacitor C4 is discharged during the time period t1–t2, maintained in a discharged state during the time period t2–t3 and charged during the time period t3–t4 to store this charge during the timer period t4–t5.

The voltage represented in curves 4–1, 4–2, 4–3 and 4—4 are applied to an auctioneering circuit 28′ which selects the highest of these voltages to provide a video output as shown in curve 4 of FIG. 4. Thus during the time period t1–t2 the voltage V1 on the capacitor C1 is selected and during the times t2–t3, t3–t4, and t4–t5, the voltage on capacitors C2, C3 and C4 are respectively selected by the auctioneering circuit 28′ to provide a demodulated video output as shown in curve 5 indicative of black intelligence in the originally recorded frequency modulated signal of curve 1 of FIG. 4. When the frequency of the recorded waveform of curve 1 drops to indicate a white level at the time t5, the capacitor C2 is permitted to charge a higher voltage level V2 as determined by the length of the half-period P2′ as shown in curve 2. The capacitor C2 thus charges linearly to the voltage V2 until a time t6 when the pulse P2′ changes polarity. The operation of the demodulating system then continues as described with each of the capacitors C3, C4, C1 ... being charged to the voltage V2, storing that voltage and being discharged in the sequence as described above.

The auctioneering circuit 28′ selects the highest voltage applied thereto from the particular capacitor C1, C2, C3 and C4, and outputs this voltage as shown in curve 4 of FIG. 4 which as indicated after the time t6 corresponds to a white level of intelligence in the FM signal shown in curve (1).

Thus, the four capacitor system of FIG. 3, the frequency deviations of the originally recorded intelligence are converted into voltage levels corresponding to the original video intelligence. The use of the four capacitor system of FIG. 3 permits a longer time for the discharge of the various capacitors since the capacitor is charged only once every four half-periods rather than every other half-period as in the system of FIG. 1. However this is done at the expense of the additional capacitors and circuitry.

C. Two Capacitor Sampling Demodulator System—FIGS. 5 and 6

Figure 5:
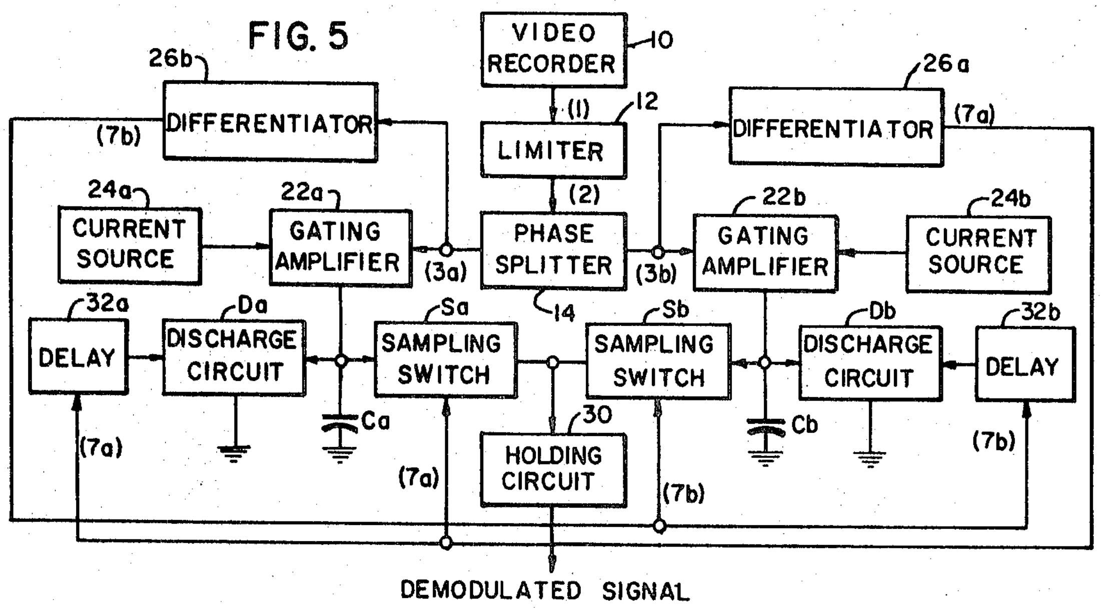
FIG. 5 is a block diagram of another embodiment of the present invention.
Figure 6:
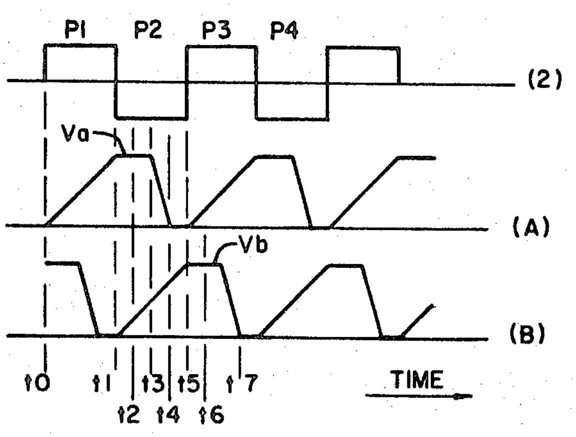
FIG. 6 is a waveform diagram including a series of curves utilized in explaining the operation of the embodiment of FIG. 5.

A two capacitor demodulating system is shown in FIG. 5 wherein a sampling technique is utilized. Components performing similar functions to the systems of FIGS. 1 and 3 are similarly designated in FIG. 5. The output of the video recorder 10 and the limiter 12 are identical as shown in the curves 1 and 2 respectively of FIGS. 2 and 4. For convenience curve 2 has been reproduced in FIG. 6 to act as a time reference in illustrating the demodulating operation of FIG. 5. The output of the limiter 2 is applied to a phase splitter 14 which is identical to that of FIG. 1 which applies outputs 3*a* and 3*b* as shown in curves 3*a* and 3*b* of FIG. 2 respectively. At the time t0 as shown in FIG. 6, which is the beginning of the half-period pulse P1 of curve 2, the gating amplifier 22*a* is turned on to connect the current source 24*a* to the integrating capacitor C*a*. The capacitor C*a* charges linearly until the time t1 at the end of the pulse P1. At this time the gating amplifier 22*a* is turned off to terminate the charging of the capacitor C*a*. The (3*b* output from the phase splitter 14 is also applied to the differentiator 26*a* which supplies in response thereto a spike sampling pulse output such as shown in curve 7*a* of FIG. 2. The spike pulse from the differentiator 26*a* turns on a sampling switch S*a* which samples the voltage level V*a* appearing on the capacitor C*a* at this time. The voltage V*a* is translated through the sampling switch S*a* to a holding circuit 30. The sampling operation occurs at a time t2 shortly after the time t1 being delayed slightly by the time delays of the differentiator 26 and the sampling switch S*a*. After the relatively short duration of the spike sampling pulse 7*a*, the sampling switch 5*a* is opened again at the termination thereof. However, the holding circuit 30 retains the voltage level V*a* until new input information is supplied thereto. The output of the holding circuit 30 is thus sampled voltage V*a* which corresponds to the demodulated output as shown in curve 9 of FIG. 2.

The differentiated output 7*a*is also applied to a delay circuit 32*a* which delays the signal for a period of time t3 minus t2. The time t3 is the reset time for the capacitor C*a*, and at this time the delay 32*a* supplies a pulse to the discharge circuit D*a* which provides a discharge path to ground therethrough for the capacitor C*a* resetting it to ground potential. The capacitor C*a* has been discharged to ground at the time t4 so that it is in condition to begin recharging at a time t5 whenever the next positive polarity pulse P3 occurs.

Now considering the capacitor C*b*, at time t1 when the charging cycle of the capacitor C*a* has terminated capacitor C*b* begins its linear charging cycle from the current source 24*b* since the gating amplifier 22*b* is gated on in response to the output 3*b* of the phase splitter 14 at this time. The capacitor C*b* continues to be charged until the time t5 when the pulse P2 terminates thereby turning off the gating amplifier 22*b*. The 3*a* output of the phase splitter 14 is also applied to the differentiator 26*b* wherein it is differentiated to provide a spike sampling pulse output such as shown in curve 7*b* of FIG. 2. The spike pulse is applied to a sampling switch S*b* to turn it on translate thereto the voltage V*b* appearing on the capacitor C*b* at the sampling time indicated as the time t6 in FIG. 6. After the termination of the spike pulse input to the sampling switch S*b*, the switch is again opened. However, the holding circuit 30 maintains the voltage level V*b* until the input thereto is changed. The output V*b* of the holding circuit 30 at this time is the demodulated output indicative of the input modulation of the FM signal.

The spike pulse output (7*b* of the differentiator 26*b* is also supplied to a delay circuit 32*b* where it is delayed for a time t7 minus t6 and then supplied to a discharge circuit V*b*. The turning on of the discharge circuit V*b* causes the capacitor C*b* to be discharged therethrough to ground potential at a time t8. The capacitor C*b* is thus reset for the next cycle of operation.

The operation of FIG. 5 continues as described. If the frequency of the FM signals such as shown in curve 1 of FIG. 2 should increase each of the capacitors C*a* and C*b* will charge to a higher voltage directly in response to the half-period at the decreased frequency. This higher voltage will then be sampled by the sampling switches S*a* and S*b*, respectively, and be held within the holding circuit 30 to be outputted as the demodulated video information of the system.

In summary, all three embodiments described herein shown in FIGS. 1, 3 and 5 provide demodulated video outputs without the requirement for phase-corrected, low-pass filters by providing a potential which is proportional to the half-period of the FM signal under consideration. Only two and four capacitor systems have been shown however it should be understood that the use of other numbers of capacitors, e.g. 3, 5, etc., is deemed to be within the scope of the present invention.

Some residual FM carrier related ripple frequency components may be present at low amplitude in the output signal due to a slight mismatch on component values or time delays. Although small in amplitude they may be discernable in the video output. The use of the high frequency preemphasis of the video prior to FM modulation and recording with corresponding deemphasis following the demodulation techniques described above as beneficial to provide additional attenuation of any residual carrier related ripple components.

I claim as my invention:

1. An FM demodulator system operative with FM signals comprising:

means for storing a plurality of potentials in response to selected halp-periods of said FM signals;

means for selecting one of said potentials from those stored which is indicative of the intelligence in said FM signals; and means for selectively removing each of said plurality of potentials from said means for storing.

2. The system of claim 1 wherein:
each of said plurality of potentials stored being proportional to each of said half-periods respectively.
3. The system of claim 2 wherein:
said means for storing includes a plurality of capacitive devices, and means for charging each of said capacitive devices respectively in response to each of said half-periods.
4. The system of claim 3 wherein:
each of said plurality potentials is stored on said plurality of capacitive devices respectively at least until said means for selecting has selected said one potential.
5. The system of claim 4 wherein:
said plurality of capacitive devices includes first and second capacitive devices,
said plurality of charging means includes first and second charging means for charging said first and second capacitive devices respectively.
said first and second capacitive devices being respectively charged to first and second of said plurality of potentials proportional to first and second of said half-periods, said first and second half-periods being successive half-periods of said FM signals,
said means for selecting selects said one potential from said first and second potential depending upon the relative magnitudes at a given time.
6. The system of claim 5 wherein:
said plurality of capacitive devices inc!udes third and fourth capacitive devices,
said plurality of charging means includes third and fourth charging means for charging said third and fourth capacitive devices respectively,
said third and fourth capacitive devices being charged to third and fourth of said plurality of potentials respectively proportional to third and fourth half-periods of said FM signals, said third and fourth half-periods respectively being the subsequent half-periods to said first and second half-periods,
means for selecting selects said one potential from said first, second, third and fourth potentials depending upon the relative magnitudes thereof at a given time.
7. The system of claim 4 wherein:
said one potential being stored in one of said capacitive devices during a given half-period while another of said capacitive devices being charged to the next of said plurality of potentials indicative of said intelligence in said FM signals.
8. The system of claim 4 wherein:
said means of selecting includes means for sampling each of said plurality of potentials and holding that potential at said one potential until said means for removing each of said potentials has operated.
9. A method of demodulating FM signals comprising the steps of:
storing a plurality of potentials in response to selective half periods of said FM signals,
selecting one of said potentials from those stores which is indicative of the intelligence in said FM signals; and
removing selectively each of said potentials which have been stored.
10. The method of claim 9 wherein:
each of said plurality of potentials stored being proportional to each of said half-periods respectively.
11. The method of claim 10 includes
selectively charging a plurality of storage means to said plurality of potentials respectively,
said one of said plurality of potentials being stored in one of said storage means during a half-period during which another of said storage means is being charged to the next one of said plurality of potentials indicative of said intelligence in said FM signals.
12. The method of claim 11 wherein:
said steps of selecting said one of said plurality of potentials includes sampling each of said plurality of potentials and holding that potentials as said one potential until removed.
13. The method the method of claim 11 wherein:
said step of selecting includes selecting said one potnetial depending upon the relative magnitude of said plurality of potentials dueing a given time.